C. KROPP.
RAKE ATTACHMENT FOR POTATO HOOKS.
APPLICATION FILED MAY 24, 1909.
938,001.
Patented Oct. 26, 1909.
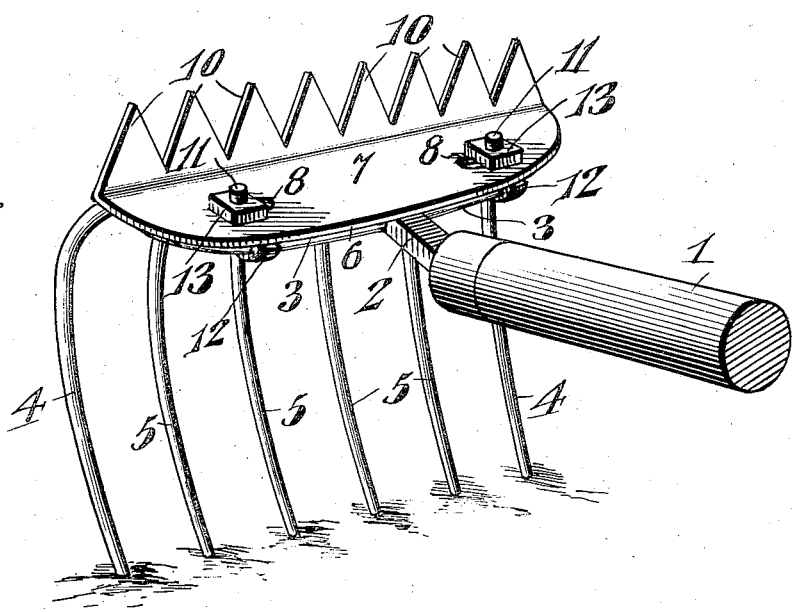
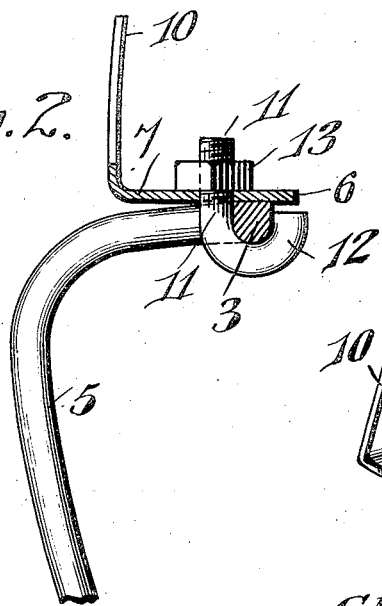
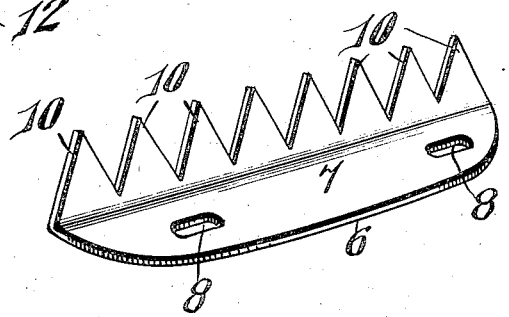
Charles Kropp, Inventor

UNITED STATES PATENT OFFICE.

CHARLES KROPP, OF GOOD HARBOR, MICHIGAN, ASSIGNOR TO ARTHUR R. McMANUS, OF TRAVERSE CITY, MICHIGAN.

RAKE ATTACHMENT FOR POTATO-HOOKS.

938,001.

Specification of Letters Patent. Patented Oct. 26, 1909.

Application filed May 24, 1909. Serial No. 497,938.

*To all whom it may concern:*

Be it known that I, CHARLES KROPP, citizen of the United States, residing at Good Harbor, in the county of Leelanau and State of Michigan, have invented a new and useful Rake Attachment for Potato-Hooks, of which the following is a specification.

This invention relates to improvements in agricultural implements, and particularly to a novel attachment for potato-hooks.

In digging potatoes, much difficulty has been experienced on account of various vegetation, such as June grass, weeds and vines, which very often surround or partially surround the potato plants; and heretofore it has been necessary for the operator to stoop over and pull by hand the said vegetation from the plants, the operation thereof being very tedious as well as consuming much valuable time.

One of the objects of the invention is to provide an implement of the character described which will obviate the necessity of the operator stooping over and removing by hand the surplus rank vegetation as above described.

Another object of the invention is to provide a rake attachment for potato-hooks which is of novel construction, cheap to manufacture and readily applicable to potato-hooks of various sizes.

The invention comprises a rake of angle-iron shape which is preferably formed of sheet metal and which is adapted to be detachably secured to the head of any potato-hook.

In the drawing: Figure 1 is a perspective view showing the rake attachment secured in position to a potato-hook. Fig. 2 is a detail sectional view of the same, showing the relative position of the rake upon the hook, and Fig. 3 is a perspective view of the rake attachment.

Like reference numerals designate corresponding parts in all figures of the drawing.

The invention is especially adapted for use in connection with a potato-hook of the usual construction, which embodies a handle 1 and tang 2; the end thereof terminating in oppositely arranged arms 3—3, each of which are forwardly extending and downwardly bent to form hooks 4—4. Extending forwardly and downwardly from the arms 3—3 and in the same plane, there are a plurality of intermediate hooks 5—5, the forwardly extending portions of the hooks being hereinafter referred to as the "head" of the potato-hook.

The invention comprises a rake attachment which is formed from a single strip of sheet metal and bent longitudinally to form an angle-shaped member, which is designated as a whole by the numeral 6. The said member 6 comprises a base portion 7 which is provided with a plurality of elongated openings 8—8, said openings being preferably arranged near the respective ends of said portion. The base portion 7 is longitudinally bent at an angle to form a series of integral rake teeth 10 which extend the entire width of the said portion.

In applying the rake attachment to a potato-hook, the device is arranged transversely on the head of said hook, in such a manner that the rake-teeth 10 are arranged forwardly of the base portion 7. Hook-bolts 11—11 are preferably employed to detachably secure the same in position. These bolts 11—11 respectively extend through the elongated openings 8—8 in such manner that the hooks 12—12 of the said bolt respectively engage the oppositely extending arms 3—3 of the potato-hook. Nuts 13—13 or other suitable means are employed in connection with the bolts 11—11 for clamping the rake attachment to the potato-hook. The elongated openings 8—8 permit of adjusting the said hook-bolts, so that the said hook can be caused to readily engage the arms 3 of the potato-hook.

What I claim is:

A rake attachment for potato-hooks formed from a single strip of sheet metal and comprising a base-portion which is provided with a plurality of elongated openings, one edge of said portion being longitudinally bent at substantially right angles to form a series of outstanding V-shaped teeth, said rake attachment being adapted to be transversely arranged and detachably secured to the head of the potato-hook by hook-bolts which are arranged to respectively extend through the said elongated openings and coact with the head of the hook and the base-portion of the rake attachment.

In testimony, that I claim the foregoing as my own, I have hereto affixed my signature in the presence of two witnesses.

CHARLES KROPP.

Witnesses:
CLAUS W. BASCH,
EMIL H. KROPP.